United States Patent [19]

Nagaoka et al.

[11] Patent Number: 4,584,906
[45] Date of Patent: Apr. 29, 1986

[54] GEAR SHIFT CONTROL FOR AN AUTOMATIC TRANSMISSION OF A VEHICLE

[75] Inventors: Mitsuru Nagaoka; Kazuya Oda, both of Hiroshima, Japan

[73] Assignee: Mazda Motor Corporation, Hiroshima, Japan

[21] Appl. No.: 603,187

[22] Filed: Apr. 23, 1984

[30] Foreign Application Priority Data

| Apr. 26, 1983 | [JP] | Japan | 58-73230 |
| Apr. 27, 1983 | [JP] | Japan | 58-74372 |
| Apr. 27, 1983 | [JP] | Japan | 58-74373 |
| Apr. 27, 1983 | [JP] | Japan | 58-74374 |
| Apr. 27, 1983 | [JP] | Japan | 58-74375 |
| Apr. 27, 1983 | [JP] | Japan | 58-74376 |

[51] Int. Cl.⁴ .............................. B60K 41/18
[52] U.S. Cl. .............................. 74/866; 74/752 A; 364/424.1
[58] Field of Search .............................. 74/866, 752 A; 364/424.1

[56] References Cited

U.S. PATENT DOCUMENTS

| 3,667,325 | 6/1972 | Ito et al. ............................. 74/866 |
| 3,684,066 | 8/1972 | Kubo et al. ....................... 74/866 X |
| 3,702,572 | 11/1972 | Wakamatsu et al. ............... 74/866 |
| 3,713,351 | 1/1973 | Sakakibara et al. ............. 74/866 X |
| 4,338,666 | 7/1982 | Suzuki et al. ................... 364/424.1 |
| 4,507,736 | 3/1985 | Klatt ............................... 364/424.1 |
| 4,523,281 | 6/1985 | Noda et al. ..................... 74/866 X |

FOREIGN PATENT DOCUMENTS

| 56-39353 | 4/1981 | Japan . |
| 0184754 | 11/1982 | Japan ............................... 364/424.1 |

*Primary Examiner*—George H. Krizmanich
*Assistant Examiner*—Dirk Wright
*Attorney, Agent, or Firm*—Fleit, Jacobson, Cohn & Price

[57] ABSTRACT

A vehicle automatic transmission including a hydraulic torque converter, a multiple stage gear mechanism and an electronic controller for controlling the gear mechanism to select an appropriate gear stage in accordance with vehicle operating conditions. The electronic controller has a first gear shift control map for controlling the gear mechanism under normal vehicle operations. It further has a second gear shift control map for operations under a traffic jam so that a better fuel economy is established than in an operation under the first map.

13 Claims, 16 Drawing Figures

GEAR SHIFT CONTROL FOR AN AUTOMATIC TRANSMISSION OF A VEHICLE

BACKGROUND OF THE INVENTION

1. Field of the Invention

The present invention relates to a control of vehicle automatic transmissions and more particularly to shift control means for a transmission gear mechanism.

2. Description of Prior Art

Conventional automatic transmissions for motor vehicles include a hydraulic torque converter and a multiple stage transmission gear mechanism connected with the torque converter. The torque converter has an automatic torque changing function wherein a torque amplification is made when the speed of the turbine runner is lower than that of the pump impeller, however, since the torque ratio is by itself insufficient for a normal vehicle operation, the multiple stage transmission gear mechanism is provided and its gear stage is appropriately selected in accordance with the vehicle operating conditions. For the purpose, modern automatic transmissions are equipped with microprocessors which include gear shift maps for determining engine operating conditions at which the transmission gear mechanisms are shifted up or down.

Usually, the shift maps are so determined that an appropriate gear stage is selected to ensure an appropriate capability of acceleration under a normal operation on a normal road. It should however be noted that the conventional control has not been satisfactory under operating conditions other than the normal operation. For example, under an uphill operation, the selected gear stage often becomes inappropriate to provide a satisfactory driving torque. In view of the above problem, there is proposed by Japanese patent application No. 54-111928 filed on Sept. 1, 1979 and disclosed for public inspection on Apr. 15, 1981 under the disclosure number of 56-39353 to use under an uphill operation gear shift maps which are modified for such uphill operation. The proposed control system is considered as being capable of solving problems of insufficient driving torque under the uphill operation, however, it does not consider anything about fuel economy which may become bad due to a case of inappropriate gear shift maps. In city area operations, for example, vehicle is required to repeat frequently stop and start due to traffic jams and, under such circumstances, the transmission gear mechanism takes the first gear stage irrespective of a very small acceleration resulting in a very poor fuel economy.

OBJECT OF THE INVENTION

It is therefore an object of the present invention to provide a vehicle automatic transmission having control means by which fuel economy under city area operations can be improved.

Another object of the present invention is to provide a vehicle automatic transmission control in which gear shift maps are provided specifically for operations under traffic jams.

A further object of the present invention is to provide, means for detecting traffic jam in a vehicle automatic transmission.

SUMMARY OF THE INVENTION

According to the present invention, the above and other objects can be accomplished by an automatic transmission for vehicles comprising a torque converter having an input member and an output member, a multiple stage transmission gear mechanism connected with the output member of the torque converter and having a plurality of gear stages, gear selecting means for selecting one of the gear stages in the transmission gear mechanism, vehicle operating condition detecting means for detecting vehicle operating conditions and producing vehicle operating condition signals, gear shift control means for operating said gear selecting means in accordance with the vehicle operating condition signals to thereby make the gear selecting means select one of the gear stages, said gear shift control means including first gear shift means having memories of first vehicle operating conditions wherein said gear selecting means is to be operated, second gear shift means having memories of second vehicle operating conditions wherein said gear selecting means is to be operated, traffic jam detecting means for detecting a traffic jam, and means for operating said gear selecting means under said first gear shift means when the traffic jam is not detected but under said second gear shift means when the traffic jam is detected so that a corresponding gear shift operation is carried out at a lower vehicle speed in a traffic jam than in an operating condition wherein the traffic jam is not detected.

The vehicle operating condition detecting means may include vehicle or torque converter output speed detecting means and engine load detecting means and in such an instance the first and second vehicle operating conditions are determined in terms of the vehicle or torque converter output speed and the engine load. The traffic jam may be detected in terms of the relationship between rate of change of vehicle speed and an average vehicle speed in a predetermined period. More specifically, where the rate of change of the vehicle speed is high with a low average vehicle speed, it may be judged that there is a traffic jam. Alternatively, the relationship between frequency of vehicle stop in a predetermined time and an average vehicle speed may be a measure for a traffic jam. Further, the relationship between vehicle acceleration and vehicle speed may also be used in judging a traffic jam. Once the traffic jam is detected, the gear selecting means is started to be controlled under the second gear shift means, and the control of the gear selecting means under the first gear shift means is started again when the vehicle speed exceeds a predetermined value or the engine load exceeds a predetermined value.

DESCRIPTION OF PREFERRED EMBODIMENTS

Structures of the Transmission

Figure 1:
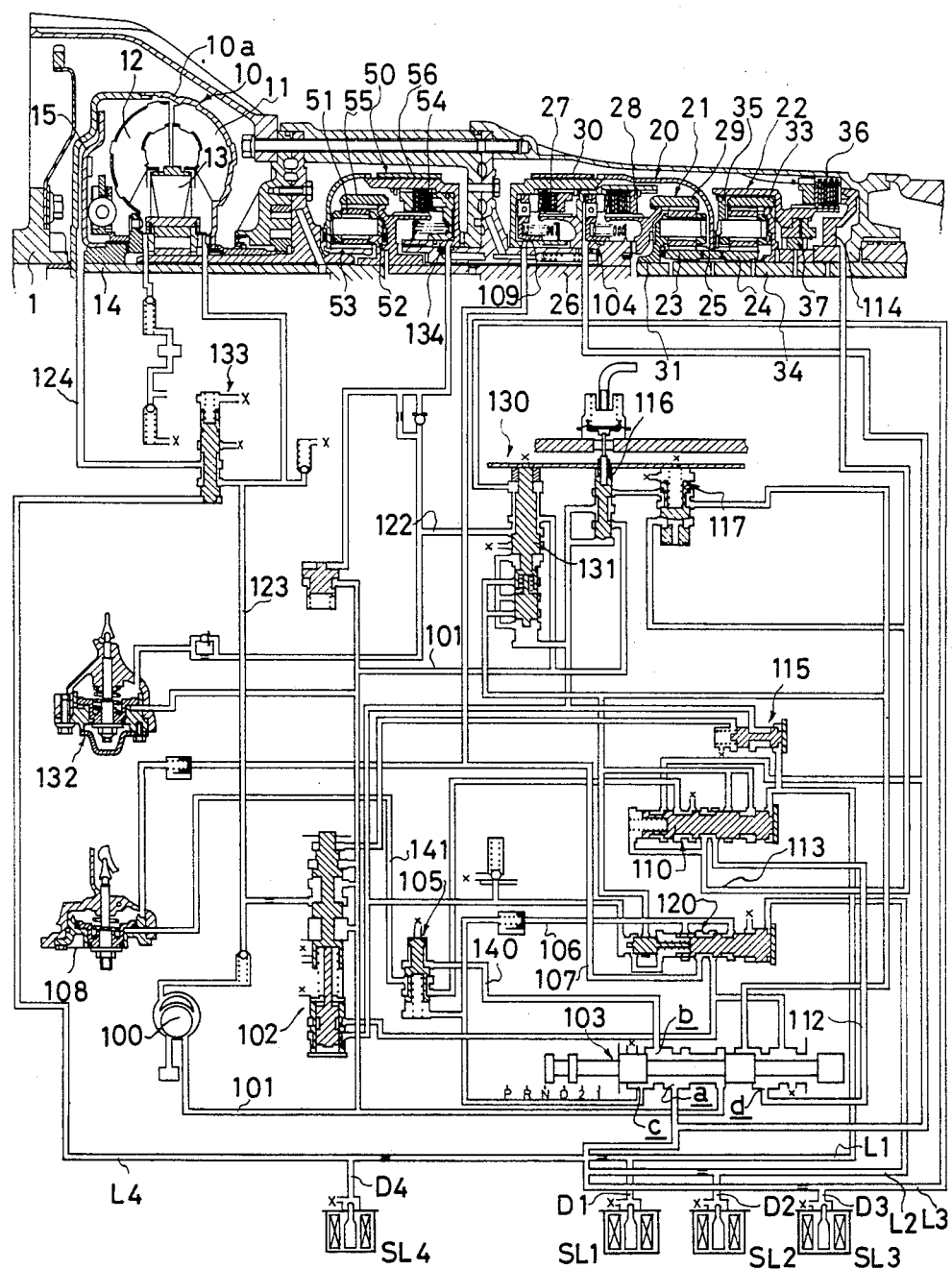
FIG. 1 is a sectional view of an automatic transmission to which the present invention can be applied.

Referring to the drawings, particularly to FIG. 1, there is shown an automatic transmission which comprises a hydraulic torque converter 10, a multiple stage transmission gear mechanism 20, and a planetary gear type overdrive transmission mechanism 50 arranged between the torque converter 10 and the multiple stage transmission gear mechanism 20.

The torque converter 10 has a pump 11 connected with an engine output shaft 1 through a converter casing 10a, a turbine 12 facing to the pump 11 and a stator 13 disposed between the pump 11 and the stator 13. A converter output shaft 14 is connected with the turbine 12. A lock-up clutch 15 is provided between the converter output shaft 14 and the casing 10a which is connected to the pump 11. The lock-up clutch 15 is normally engaged with the casing 10a under a pressure of hydraulic fluid which circulates in the torque converter 10, and is released by a hydraulic pressure, which is drawn to a space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 through a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and internal gear 55 which is also engaged with the planetary gears 51 and connected with the sun gear 53 through a direct connecting clutch 54. An overdrive brake 56 is provided between the sun gear 53 and the transmission casing. The internal gear 55 is connected with the input shaft 26 of the multiple stage transmission gear mechanism 20.

The multiple stage transmission gear mechanism 20 is of known type and can provide three forward driving gear stages and one reverse stage. The planetary gear type overdrive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

Hydraulic Control Circuit

The above-mentioned automatic transmission is provided with a hydraulic control circuit as shown in FIG. 1. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of shift positioned in one of the shift positions 1, 2 and D. The pressure line 101 is communicated with ports a, b, c of the select valve 103. The port a is communicated with a hydraulic actuator 104 for the rear clutch 28. When the select valve 103 is positioned in the above mentioned position the actuator 104 makes the rear clutch 28 engage. The port a is also communicated with the left-hand end portion of a 1-2 shift valve 110 having a spool which is now biased rightward in FIG. 1 under the oil pressure from the port a. The port a is further communicated with the right-hand end portion of the 1-2 shift valve 110 through a first line L1, the right-hand end portion of a 2-3 shift valve 120 through a second line L2, and the right-hand end portion of a 3-4 shift valve 130 through a third line L3. Second and third drain lines D1, D2 and D3 are provided in the first, second and third lines L1, L2 and L3, respectively. These drain lines D1, D2 and D3 are respectively provided with a first, second and third solenoid valves SL1, SL2 and SL3 for opening and closing them. When the port a is communicated with the line 101, the solenoid valves SL1, SL2 and SL3 are energized to close the drain lines D1, D2, D3, and as a result, the pressure in the first, second and third lines L1, L2, L3 increases.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with the line 141 so that the oil pressure is introduced into a brake engaging pressure chamber of the actuator 108 to engage the front brake 30. The port c is communicated with the second lock valve 105. The oil pressure which is applied from the port c to the second lock valve 105 acts to bias the spool of the valve 105 upward. The port c is also communicated with the 2-3 shift valve 120 through a pressure line 106. The line 106 is communicated with a line 107 when the spool of the 2-3 shift valve 120 is moved leftward by the pressure in the second line L2 which increases upon energizing the solenoid valve SL2 in the drain line D2. The line 107 is communicated with the releasing pressure chamber of the actuator 108. When oil pressure is introduced into such releasing pressure chamber, the actuator 108 is moved to release the brake 30 against the pressure in the engaging pressure chamber. Besides, the pressure in the line 107 is introduced into the actuator 109 for the front clutch 27 to make the clutch 27 engage.

The select valve 103 has a port d which is communicated with the pressure line 101 when the valve 103 is positioned in the position 1. The port d is communicated with the 1-2 shift valve 110 through a line 112, and with an actuator 114 for the rear brake 36 further through a line 113. When the solenoid valve SL1 and SL2 are energized, the spools of the 1-2 shift valve 110 and the 2-3 shift valve 120 are moved to thereby change the port connections for engaging appropriate brakes and-/or clutches to establish 1-2, 2-3 shifting operations respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

Furthermore, this hydraulic control circuit is provided with a 3-4 shift valve 130 and an actuator 132 for controlling the clutch 54 and the brake 56 of the planetary gear type over-drive transmission mechanism 50. The actuator 132 has an engaging pressure chamber communicated with the pressure line 101. The brake 56 is operated when the actuator 132 is moved under the pressure in the line 101. When the solenoid valve SL3 is energized, the spool of the 3-4 shift valve 130 is moved downward to communicate the pressure line 101 with a line 122 so that the oil pressure is introduced into the line 122. The oil pressure introduced into the line 122 acts on a releasing pressure chamber of the actuators 132 to release the brake 56, and on an actuator 134 to make the clutch 54 engage.

Still furthermore, the present hydraulic control circuit is provided with a lock-up control valve 133, which is communicated with the port a of the select valve 103 through a line L4. From the line L4, divided is a drain line D4 which is provided with a solenoid valve SL4. When the pressure in the line L4 increases by closing the drain line D4 with the solenoid valve SL4 being energized, the lock-up control valve 133 has its spool moved to cut the communication between the lines 123 and 124 and drain the pressure in the line 124 so that the lock-up clutch 15 is engaged.

In the above arrangement, the relations of the respective transmission gear stages and the lock-up with respect to the operations of the solenoids, the clutches and the brakes are shown in the Tables 1 through 3.

TABLE 1

| Shift position | Solenoid valve | | |
|---|---|---|---|
| | 1 | 2 | 3 |
| 1 | OFF | OFF | OFF |
| 2 | ON | OFF | OFF |
| 3 | ON | ON | OFF |
| 4 | ON | ON | ON |

TABLE 2

| SOL 4 | Lock-up |
|---|---|
| ON | engage |
| OFF | release |

TABLE 3

| | | clutch 28 | clutch 27 | clutch 15 | clutch 54 | brake 36 | brake 30 | brake 56 | one-way clutch 37 | gear ratio |
|---|---|---|---|---|---|---|---|---|---|---|
| | P | | | | o | | | | | |
| | R | | o | | o | o | | | | 2.181 |
| | N | | | | o | | | | | |
| D | first | o | | | o | | | | o | 2.458 |
| | second | o | | (o) | o | | o | | | 1.458 |
| | third | o | o | (o) | o | | | | | 1.000 |
| | OD | o | o | (o) | | | | o | | 0.685 |
| | 2 | o | | | o | | o | | | 1.458 |
| 1 | first | o | | | o | o | | | | 2.458 |
| | second | o | | | o | | o | | | 1.458 |

Electronic Control Circuit

Figure 2:
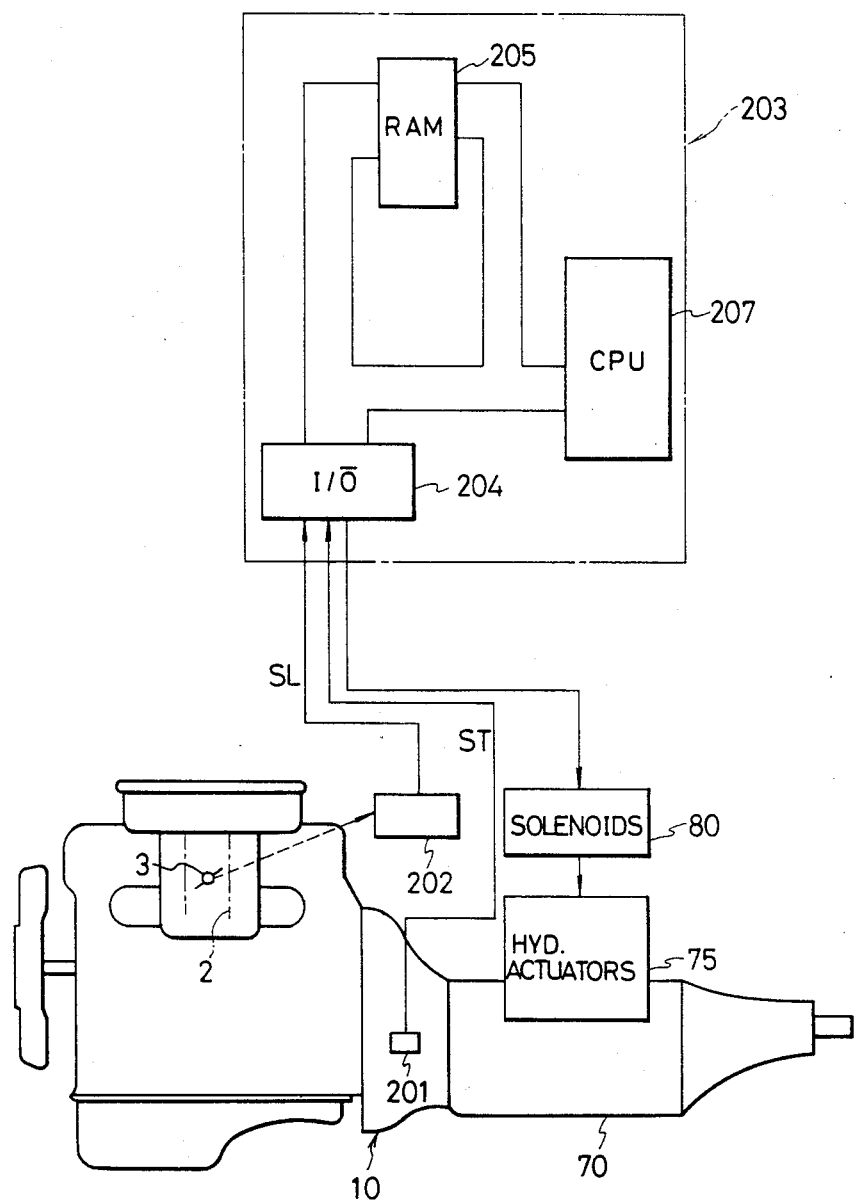
Figure 2 is a diagrammatical illustration of a transmission control system in accordance with one embodiment of the present invention.

Referring to FIG. 2, there is shown an electronic control circuit for controlling the above hydraulic control circuit. The electronic control circuit can be constituted of a microcomputer 203 which is provided with an input-output equipment (I/O) 204, a random access memory (RAM) 205 and a central processing unit (CPU) 207. For supplying signals to the I/O, there are provided an engine load sensor 202, and a torque converter turbine speed sensor 201. The engine load sensor 202 detects the load on the engine in terms of the opening of an engine throttle valve 3 provided in the intake passage 2 of the engine to produce an engine load signal SL. The turbine speed sensor 201 senses the rotating speed of the converter output shaft 14 to produce a turbine speed signal ST.

The I/O receives the engine load signal SL and the turbine speed signal ST, processes these signals, and applies them to the RAM 205. The RAM memorizes the signals SL and ST and applies these signals SL and ST and other data pre-stored in the RAM to the CPU 207 in accordance with commands of the CPU. As examples of the prestored data there are a gear shift-up and shift-down maps and a lock-up control map. The maps include a gear shift-up control lines gear shift-down control lines. The maps also include torque converter lock-up control lines. These lines are drawn as functions of the engine throttle valve opening and the torque converter turbine speed. As another example of the pre-stored data, shift data lines may be provided as functions of the engine or turbine speed, the engine load and the operation mode of the vehicle.

In accordance with a certain program which can be adopted in the present invention, the CPU 207 reads one of the shift lines and the lock-up control map according to the engine load signal SL, and determines whether or not a shift operation shall be carried out on the basis of comparison of the turbine speed signal ST with the shift line concerned, and whether or not the lock-up shall be engaged on the basis of comparison of the turbine speed signal ST with the lock-up control map. The CPU 207 thus produces a shift signal and a lock-up signal and applies them through the I/O 204 to an electromagnetic device 80 constituted by the group of solenoid valves SL1 through SL4 for operating the 1-2 shift valve 110, the 2-3 shift valve 120, the 3-4 shift valve 130 and the lock-up control valve 133.

Shift Control Maps $Lu_1$, $Lu_2$, $Ld_1$, $Ld_2$

Figure 3:
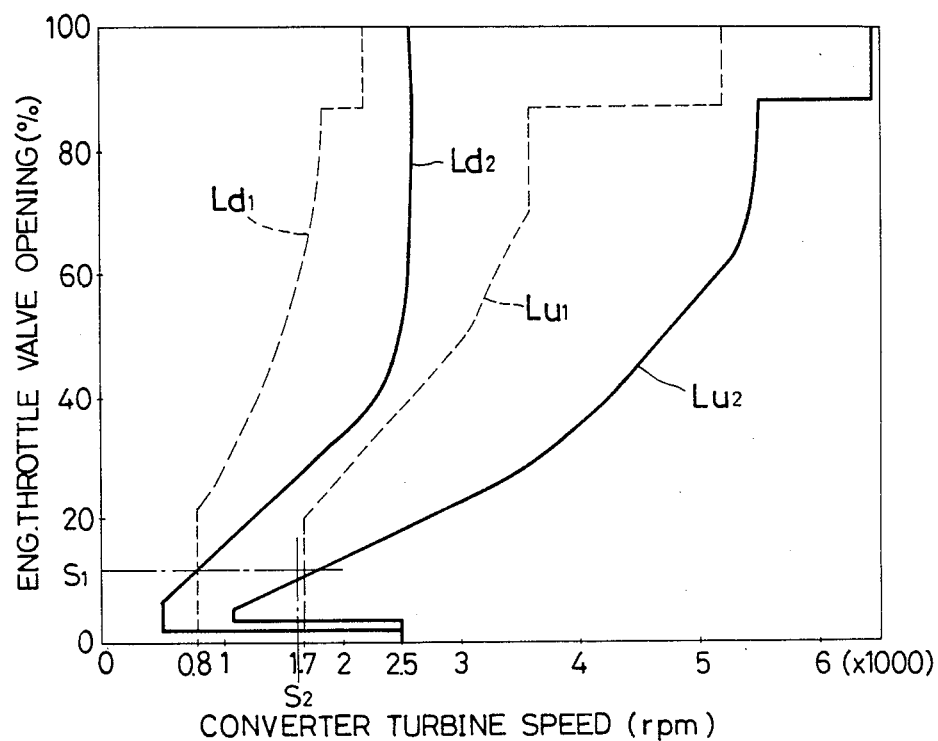
FIG. 3 is a gear shift control map used in the control system shown in FIG. 2.
Figure 4:
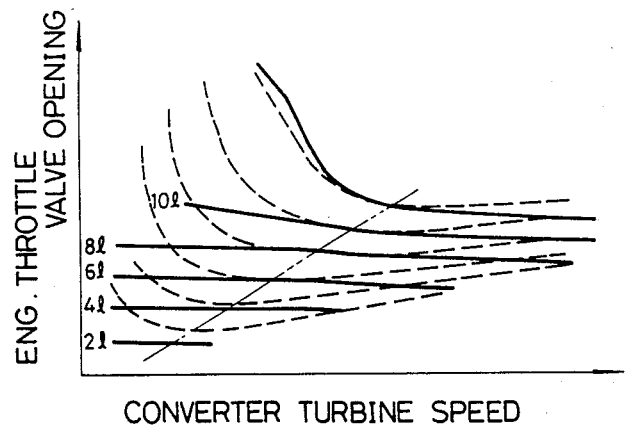
FIG. 4 is a diagram showing fuel flow characteristics and engine output characteristics as functions of the engine throttle value position and the torque converter output speed.

Referring to FIG. 3, the gear shift maps include a first gear shift control lines $Lu_1$ and $Ld_1$ respectively for gear shift-up and shift-down controls. The lines $Lu_1$ and $Ld_1$ are drawn as functions of the engine throttle valve opening representing the engine load and the torque converter turbine speed representing the vehicle speed so that an appropriate capability for acceleration can be ensured for normal vehicle operations simultaneously providing a reasonable fuel economy. When the vehicle operating condition crosses the shift-up line $Lu_1$ from left to right, a shift-up is carried out from the first gear stage to the second gear stage. Since the line $Lu_1$ is drawn on the basis of the torque converter turbine speed, it can also be used for shift-up controls from the second to the third and from the third to fourth gear stages. When the vehicle operating condition crosses the shift down line $Ld_1$ from right to left, a shift down is carried out from the second to the first gear stage. The line $Ld_1$ can also be used for shift down controls from the fourth to third and from the third to second gear stages. There are also provided second shift control lines $Lu_2$ and $Ld_2$ respectively for alternative gear shift-up and shift-down controls. The lines $Lu_2$ and $Ld_2$ are drawn based on fuel flow lines and driving torque lines drawn as functions of the engine throttle valve opening and the torque converter turbine speed as shown in FIG. 4. In FIG. 4, solid lines show equal fuel flow lines whereas broken lines show equal driving torque lines. From these lines, it is possible to draw a best fuel economy line as for example shown by a chain line in FIG. 4. The substantial parts of the lines $Lu_2$ and $Ld_2$ are prepared by modifying the best fuel economy line in accordance with the gear ratio of the gear transmission mechanism. In a low turbine speed range, the second shift lines $Lu_2$ and $Ld_2$ cross the first shift lines $Lu_1$ and $Ld_1$, respectively, and extend beyond the lines $Lu_1$ and $Ld_1$ toward a further low speed range. It will therefore be understood that, under the control using the shift lines $Lu_2$ and $Ld_2$, gear shift operations are performed in the low turbine speed range at turbine speeds lower than those at which the gear shift operations are performed under the control by the lines $Lu_1$ and $Ld_1$.

General Operation

The gear shift and lock-up control by the aforementioned electronic control circuit 203 will now be described. Preferably, the control circuit 203 is made of a microprocessor which is programmed to carry out the operation in accordance with the flow charts for example as shown in FIGS. 4, 5, 6, 7 and 8.

Figure 5:
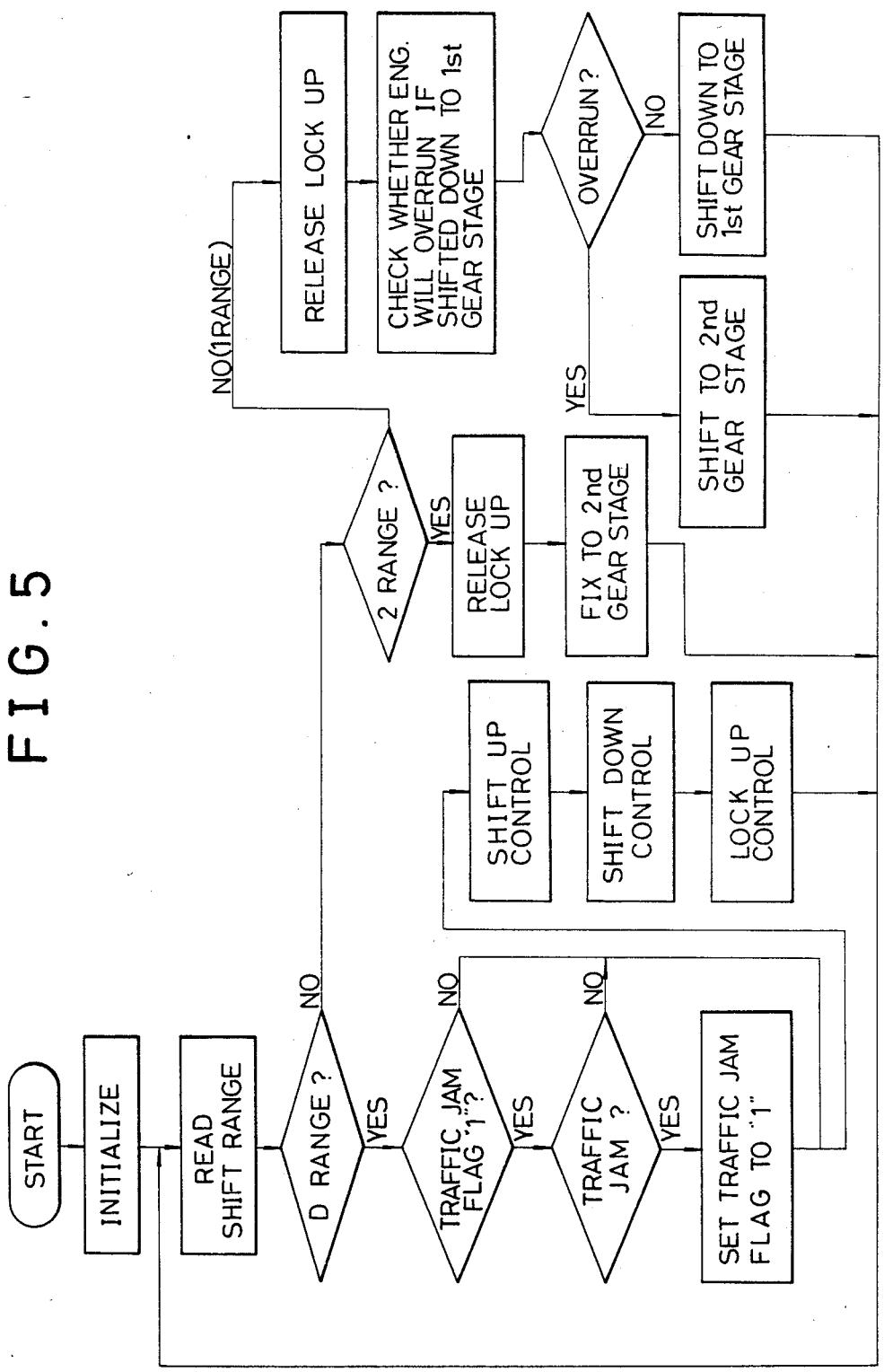
FIG. 5 is a program flow chart showing the basic control of the transmission.

FIG. 5 shows in general the operation of the control circuit. When the program is initialized, the ports in the respective hydraulic control valves and the counters in the circuit are brought into initialized positions to thereby hold the gear mechanism at the first stage and release the torque converter lock-up clutch 15. Thereafter, the shift range or the position of the select valve 103 is read and a judgement is carried out as to whether the shift range is at the "D" range. If the judgement is NO, a further judgement is carried out as to whether the shift range is "2" range. If the judgement is YES, signals are applied to the shift valves to release the lock-up and to fix the gear mechanism 20 at the second stage. If the judgement is to indicate that the shift range is not at the second stage, it is interpreted that the shift range is "1" range. Therefore, a signal is produced to release the lock-up clutch and thereafter an operation is made as to whether the engine will over-run when the gear mechanism is shifted down to the first stage. When the result of the operation indicates that there will be no engine overrun, the gear mechanism is shifted down to the first stage. When it is judged that there will be an engine overrun, the gear mechanism is shifted to the second stage.

When the first-mentioned judgement is to indicate that the shift range is "D" range, the position of the "traffic jam" flag is read and if the flag is at the position "1", shift controls are carried out as will be described later. If the position of the flag is at "0", judgement is made as to whether there is a traffic jam. Where the result of the judgement is "NO", the shift controls are carried out. Where the result of the judgement is "YES", the traffic jam flag is set to "1" and the shift controls are carried out.

Shift-up Control

Figure 6:
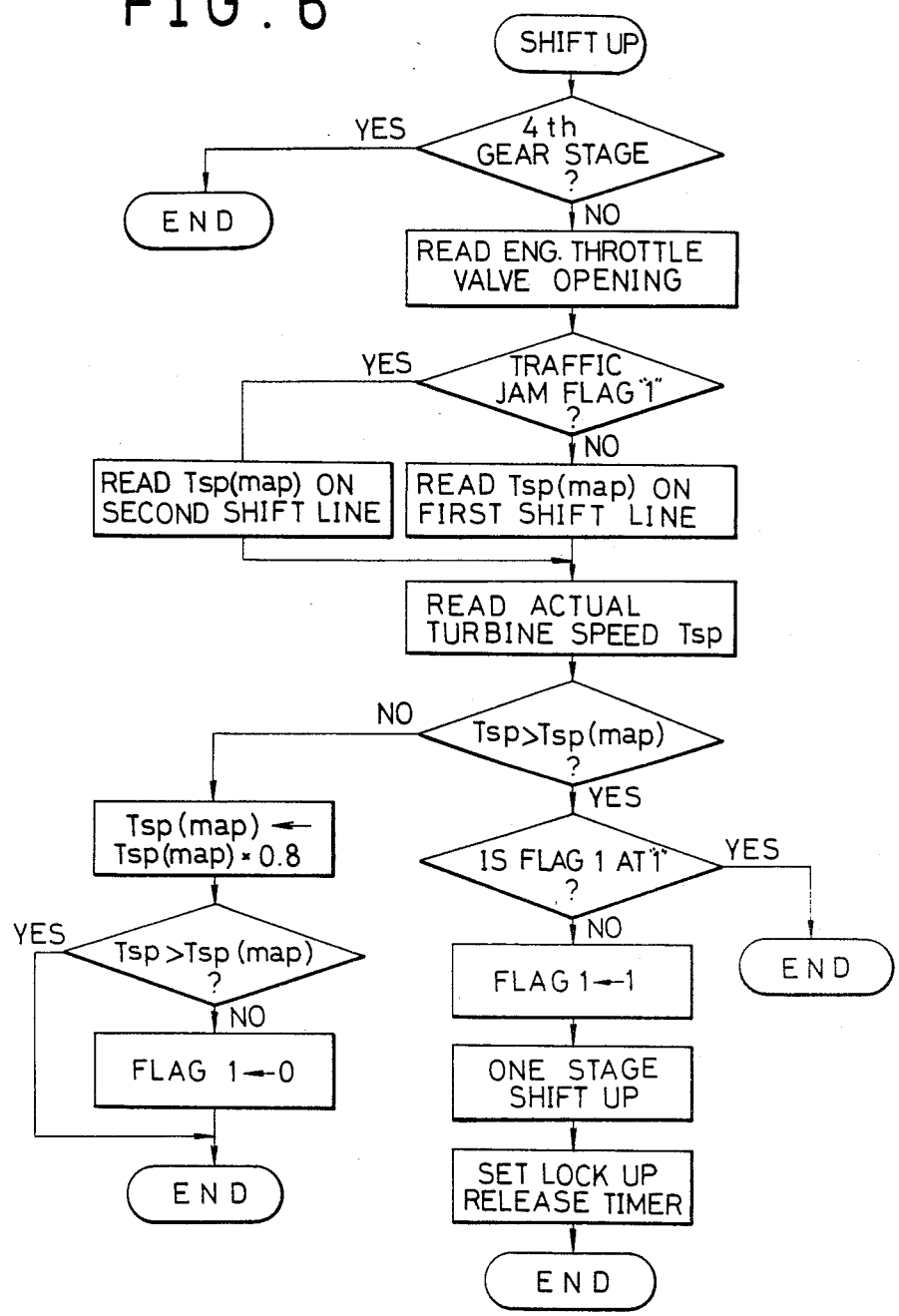
FIG. 6 is a flow chart showing the gear shift-up control.

Referring to FIG. 6, the gear position of the transmission gear mechanism 20 is at first read and judgement is made as to whether the gear mechanism 20 is at the fourth stage. If the judgement is YES, the shift-up control is terminated because no further shift-up is possible.

If the fourth gear stage judgement is NO, the engine load signal SL from the sensor 202 is read and thereafter judgement is made as to whether the traffic jam flag is set to "1" position. When the judgement is NO, the first shift lines $Lu_1$ and $Ld_1$ as shown in FIG. 3 are read. If the judgement is YES, the second shift lines $Lu_2$ and $Ld_2$ are read. Then, the torque converter turbine speed $T_{SP}$(map) is read on the shift-up line $Lu_1$ or $Lu_2$ in the shift-up map to know the turbine speed on the line $Lu_1$ or $Lu_2$ corresponding to the actual engine load or the throttle valve position. Then, the actual turbine speed $T_{SP}$ is obtained from the turbine speed signal ST and compared with the turbine speed $T_{SP}$(map) as obtained on the line $Lu_1$ or $Lu_2$.

If the actual turbine speed $T_{SP}$ is larger than the map turbine speed $T_{SP}$(map), the position of a flag 1 is read. The flag 1 is provided for memorizing that the gear shift-up operation is being carried out. If the flag 1 is set to "1", it is judged that the shift-up operation is being carried out and the shift-up control procedure is terminated. However, if the flag 1 is at "0" position, it is set to "1" and a single stage shift-up operation is carried out. Then, the lock-up release timer is set in order that the lock-up clutch 15 is released for a certain period so as to avoid any shock which may be produced when the gear stage is changed.

Figure 9:
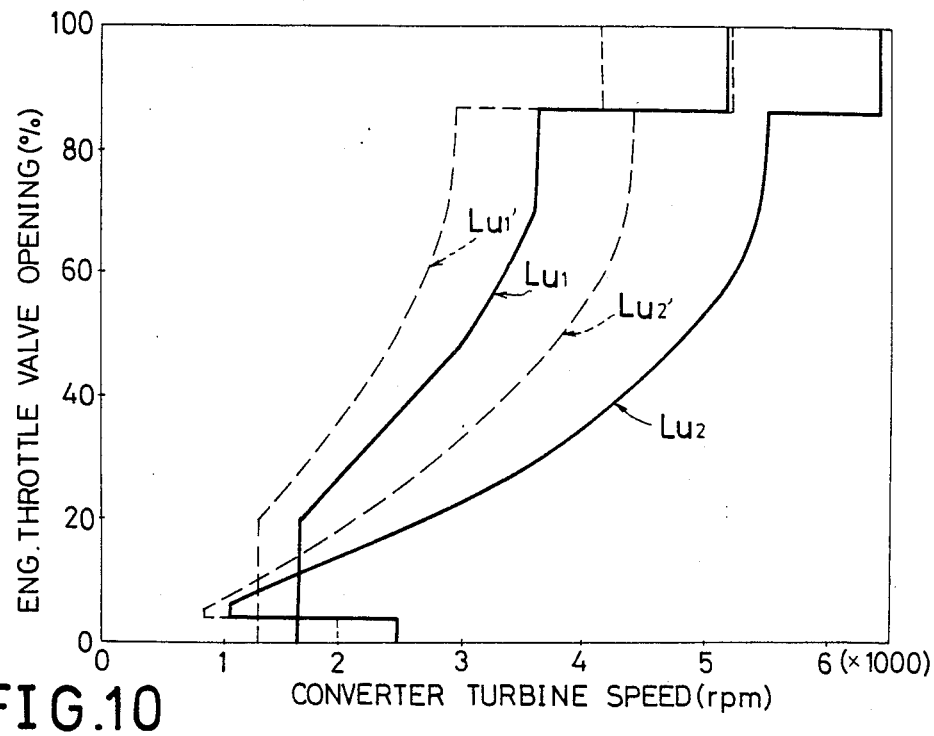
FIGS. 9 and 10 show respectively the gear shift-up and shift-down maps for explaining the function of the control.

If the actual turbine speed $T_{SP}$ is not larger than the map turbine speed $T_{SP}$ (map), the map turbine speed $T_{SP}$ (map) is multiplied with 0.8 to provide new shift lines $Lu_1'$ and $Lu_2'$ as shown in FIG. 9. On the new shift-up line $Lu_1'$, a new map turbine speed $T_{SP}$(map) is read and this new speed $T_{SP}$ (map) is then compared with the actual turbine speed $T_{SP}$ (map). If the actual turbine speed $T_{SP}$ is larger than the new map turbine speed $T_{SP}$ (map), the shift-up control procedure is terminated. With the actual turbine speed $T_{SP}$ not larger than the new map turbine speed $T_{SP}$ (map), the flag 1 is set to "0" and the procedure is terminated.

Shift Down Control

Figure 7:
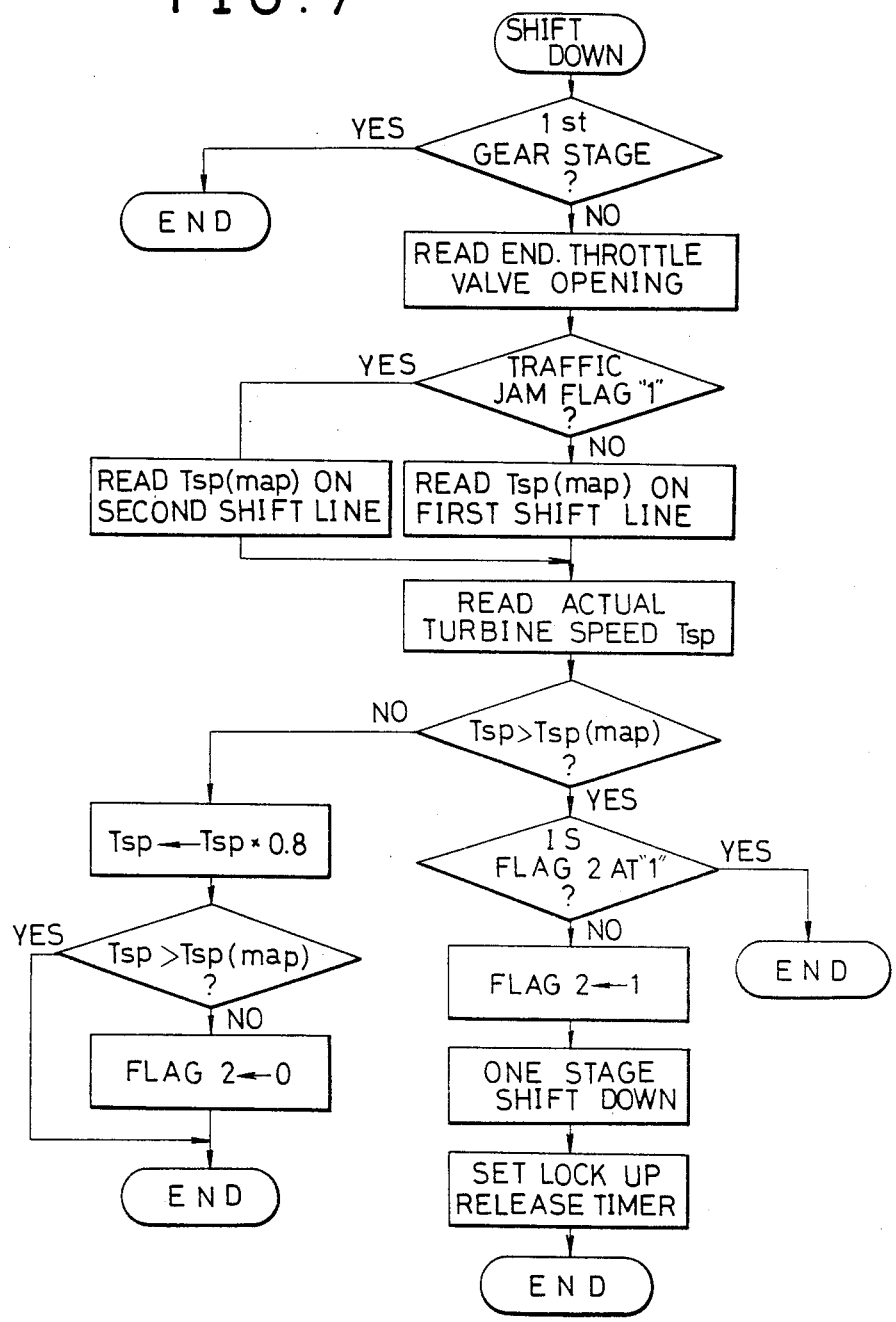
FIG. 7 is a flow chart showing the gear shift-down control.

As shown in FIG. 7, in the gear shift down control, the gear position of the transmission gear mechanism 20 is at first read and judged whether the gear mechanism is at the first stage. If the judgement is YES, no further control can be carried out so that the control is terminated.

If the aforementioned judgement is NO, a further judgement is made as to whether the traffic jam flag is reset to "1" and if the judgement is NO, the first shift lines $Lu_1$ and $Ld_1$ are read. When the judgement is YES, the second shift lines $Lu_2$ and $Ld_2$ are read.

Figure 10:
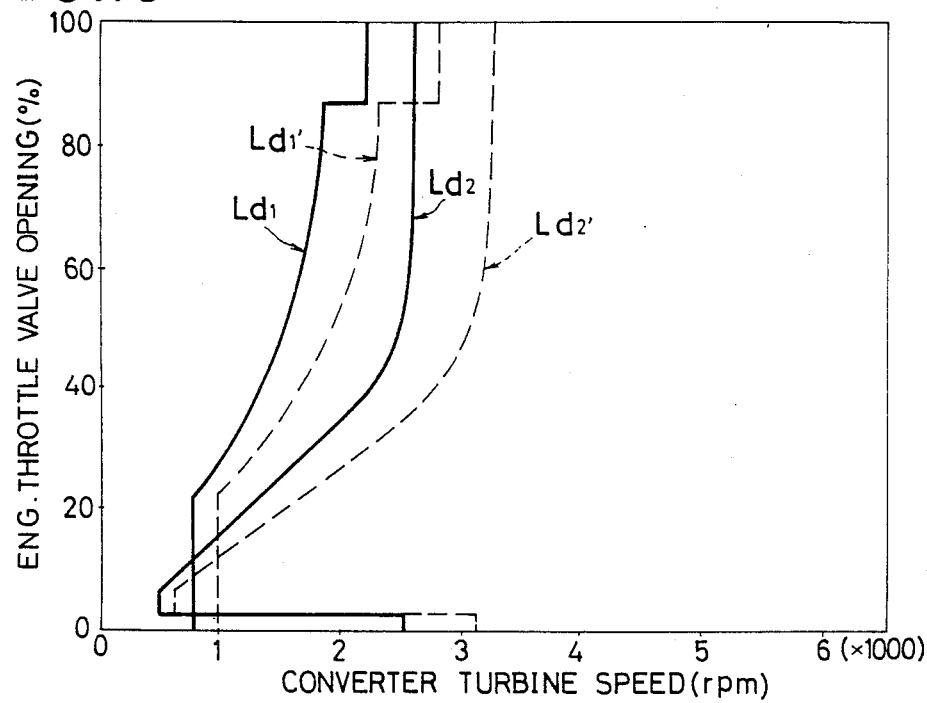

Thereafter, similar procedures are carried out as in the shift-up control. In the shift-down control, however, flag 2 is used instead of the flag 1 to show that a shift down operation is being carried out. In this control, judgement is made as to whether the map turbine speed $T_{SP}$ (map) is larger than the actual speed $T_{SP}$ and when the judgement is YES, the control proceeds to the shift down operation. When the judgement is NO, new shift down lines $Ld_1'$ and $Ld_2'$ are provided as shown in FIG. 10.

Lock-up Control

Figure 8:
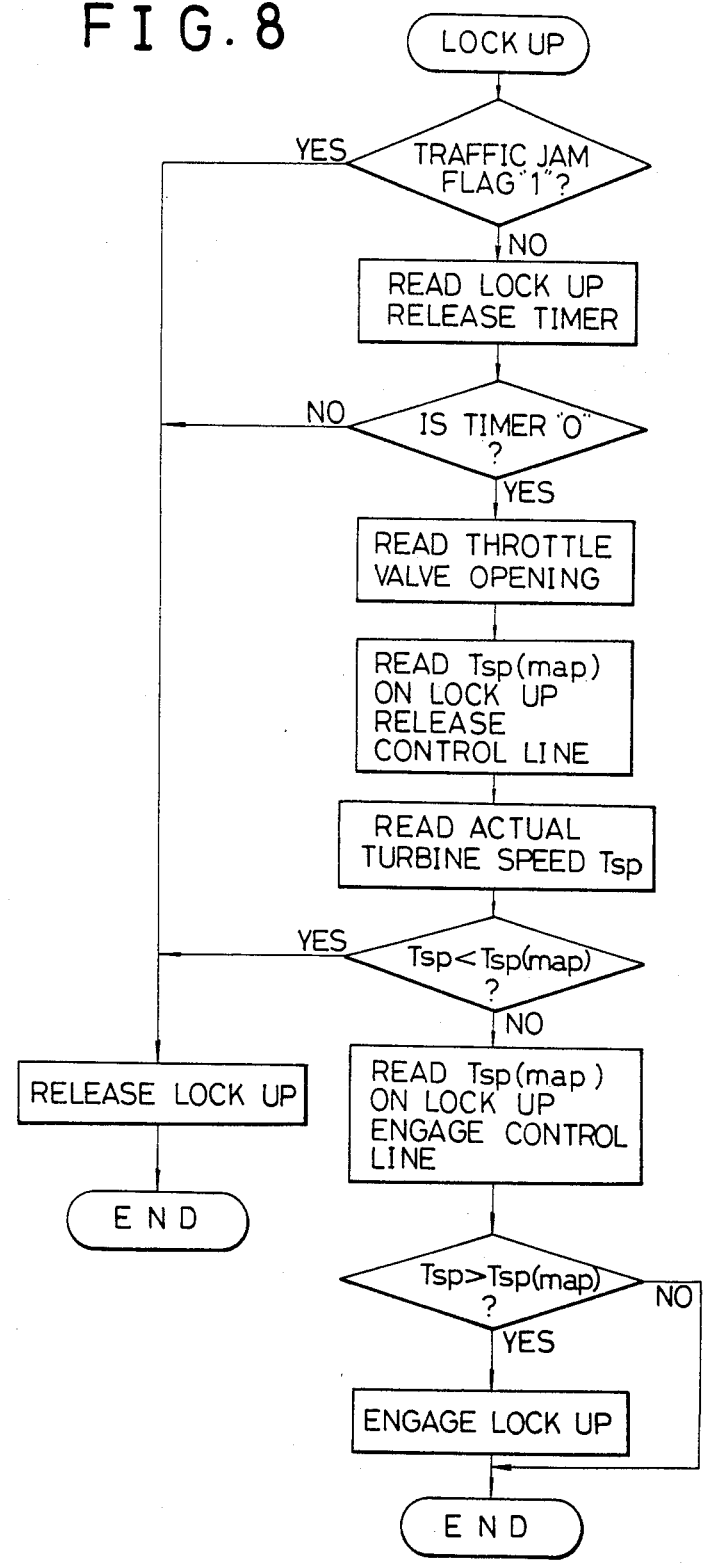
FIG. 8 is a flow chart showing the torque converter lock-up control.

Referring to FIG. 8, in the lock-up control, judgement is made as to whether the traffic jam flag is set to "1". If the result is YES, the lock-up clutch 15 is released. If the result is NO, further, the lock-up release timer is read and, if the count of the timer is not zero, the lock-up is released so that the gear shift operations are carried out with the lock-up clutch 15 released. If the count of the lock-up release timer is zero, then the engine throttle valve position is read and the map turbine speed $T_{SP}$ (map) is read on the lock-up release control line (not shown) based on the actual throttle valve position. Thereafter, the actual turbine speed $T_{SP}$ is read and compared with the map turbine speed $T_{SP}$ (map). When the actual turbine speed $T_{SP}$ is not larger than the map turbine speed $T_{SP}$ (map), the lock-up clutch 15 is released.

However, when the map turbine speed $T_{SP}$ (map) is larger than the actual turbine speed, a new map turbine speed $T_{SP}$ (map) is read on the lock-up engage control line (not shown) based on the actual engine throttle valve position. The new map turbine speed $T_{SP}$ (map) is then compared with the actual turbine speed $T_{SP}$ and, when the latter is larger than the former, the lock-up clutch is engaged.

Control under Traffic Jam

As described above, the control circuit 203 functions to detect a traffic jam and, when it is found that there is a traffic jam, the lock-up clutch 15 is released and the shift-up and shift-down controls are carried out by the second shift lines $Lu_2$ and $Ld_2$. It will be noted that under a traffic jam, vehicles are operated with relatively small throttle valve openings with relatively low torque converter turbine speeds. In such light load, low speed vehicle operations, the second shift lines $Lu_2$ and $Ld_2$ are at low speed sides of the first shift lines $Lu_1$ and $Ld_1$ as shown in FIG. 3. Therefore, a shift-up to a higher gear stage, that is, the second stage, and a shift-down to a lower gear stage, that is, the first stage are carried out at speeds lower than those at which the corresponding shift operations will be carried out when the controls are made under the first shift lines $Lu_1$ and $Ld_1$. Therefore, it is possible to obtain an improved fuel economy in operations under a traffic jam.

It should be noted that, in the aforementioned control procedure, judgements may further be made, after detection of the traffic jam, to know whether the engine throttle valve opening is smaller than a predetermined value $S_1$ and the torque converter turbine speed is smaller than a further predetermined value $S_2$ as shown in FIG. 3 and to use the second shift lines $Lu_2$ and $Ld_2$ only when the results of judgements are YES. This control procedure can be adopted because, under traffic jams, vehicles are mostly operated with small throttle valve openings and low torque converter turbine speeds.

Detection of Traffic Jam

Detection by Acceleration

Figure 11:
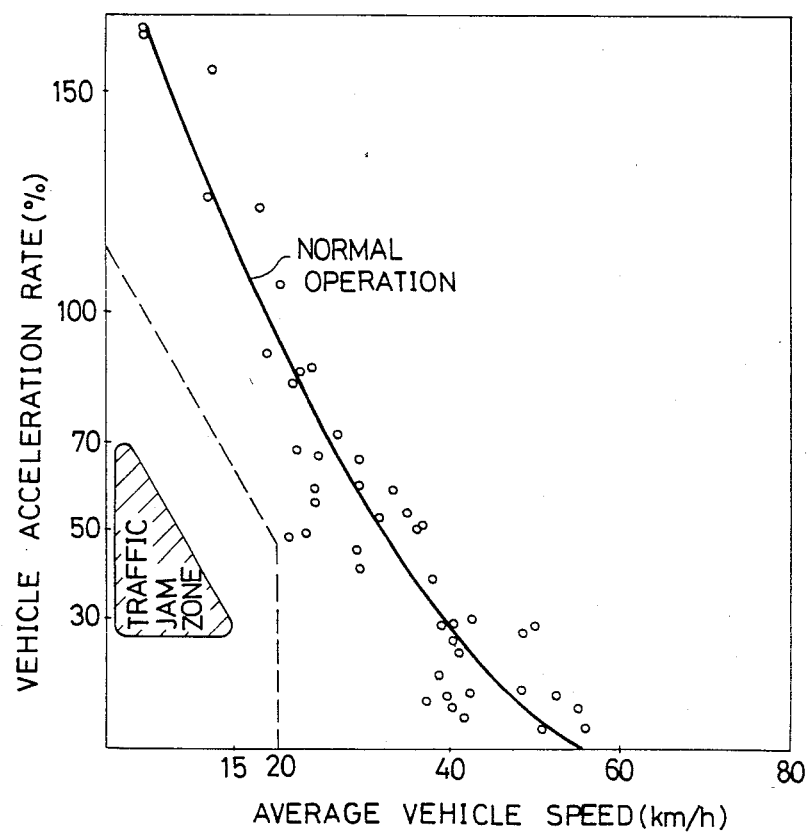
FIG. 11 is a diagram showing one example of detecting a traffic jam.
Figure 12:
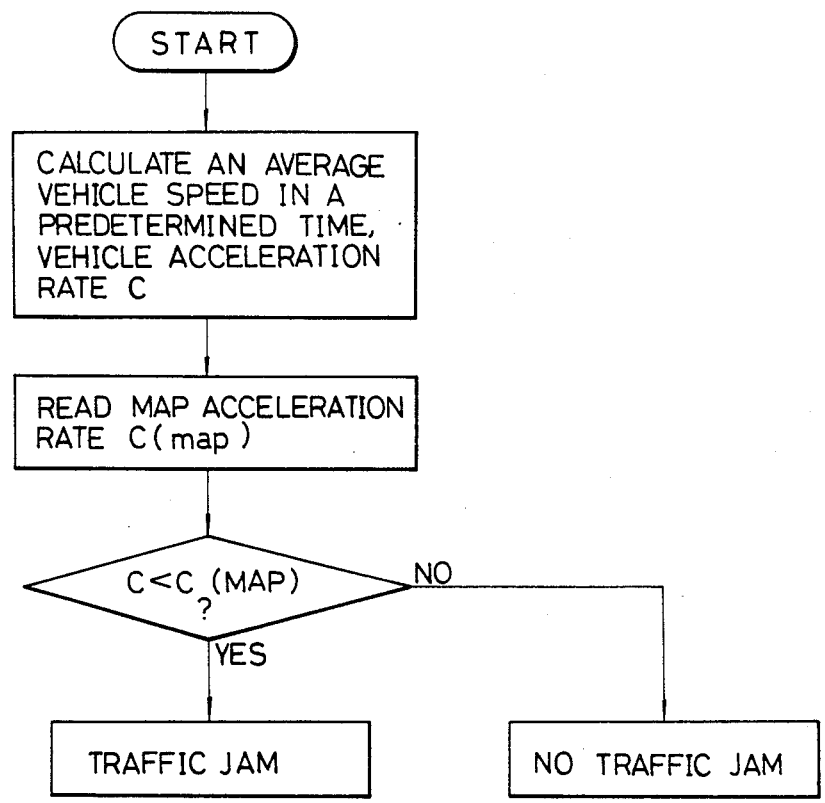
FIG. 12 is a program flow chart showing the procedure of detecting the traffic jam on the diagram shown in FIG. 11.

FIG. 11 shows a relationship between the instantaneous vehicle acceleration rate and the average vehicle speed. The relationship is as shown by a solid line in FIG. 11 under a normal operation, however, in an operation under a traffic jam, the acceleration rate will be in a shadowed zone with respect the average vehicle speed. Therefore, it is possible to provide the RAM 205 with a jam detection map as shown by broken lines in FIG. 11. FIG. 12 shows a program flow 206 for the detection of the traffic jam. At first, operations are made based on the turbine speed signal ST to obtain an average vehicle speed in a predetermined time interval and an actual vehicle acceleration rate c. Based on the average vehicle speed as obtained above, a map acceleration rate c (map) is read on the jam detection map. Then, the map rate c (map) is compared with the actual acceleration rate c and it is judged that there is a traffic jam when the actual rate c is smaller than the map rate c (map).

Detection by Vehicle Stop Frequency

Figure 13:
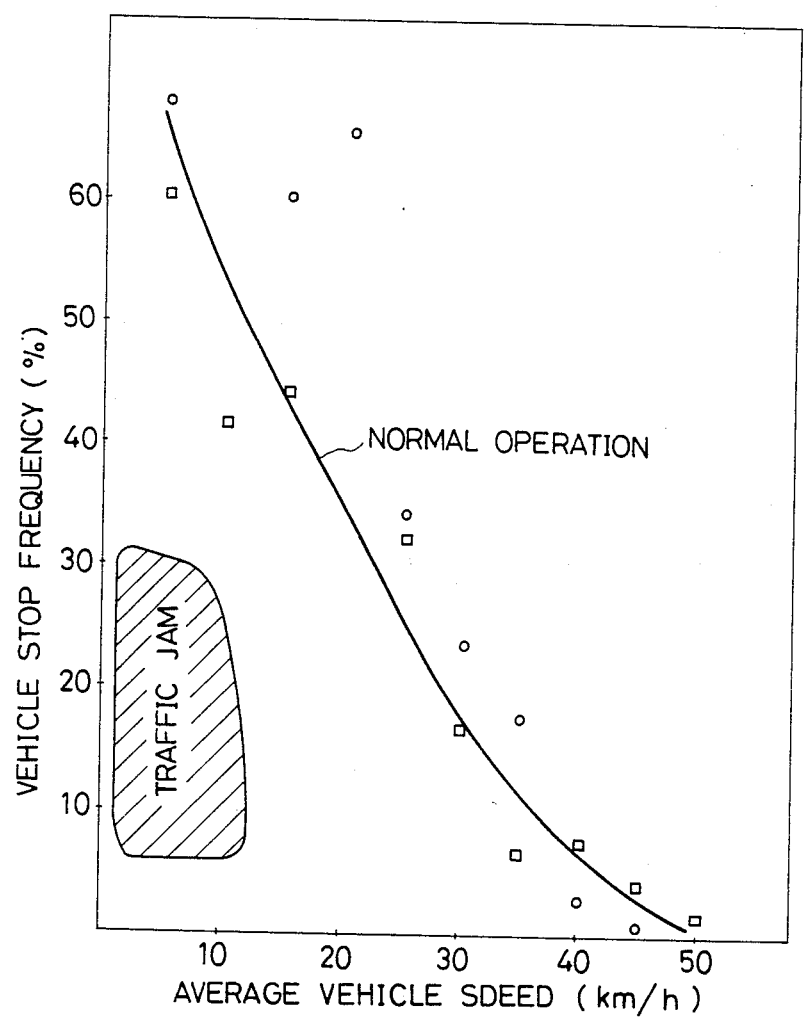
FIG. 13 is a diagram showing another example of detecting a traffic jam.

FIG. 13 shows a relationship between the frequency of vehicle stops and the average vehicle speed. In normal vehicle operation, the relationship is as shown by a solid line in FIG. 13, however, in traffic jams, the vehicle stop frequency and the average vehicle fall in shadowed zone. Thus, it is possible to draw a traffic jam map as an area covering the shadowed zone.

Detection by Forward Vehicle Acceleration

Figure 14:
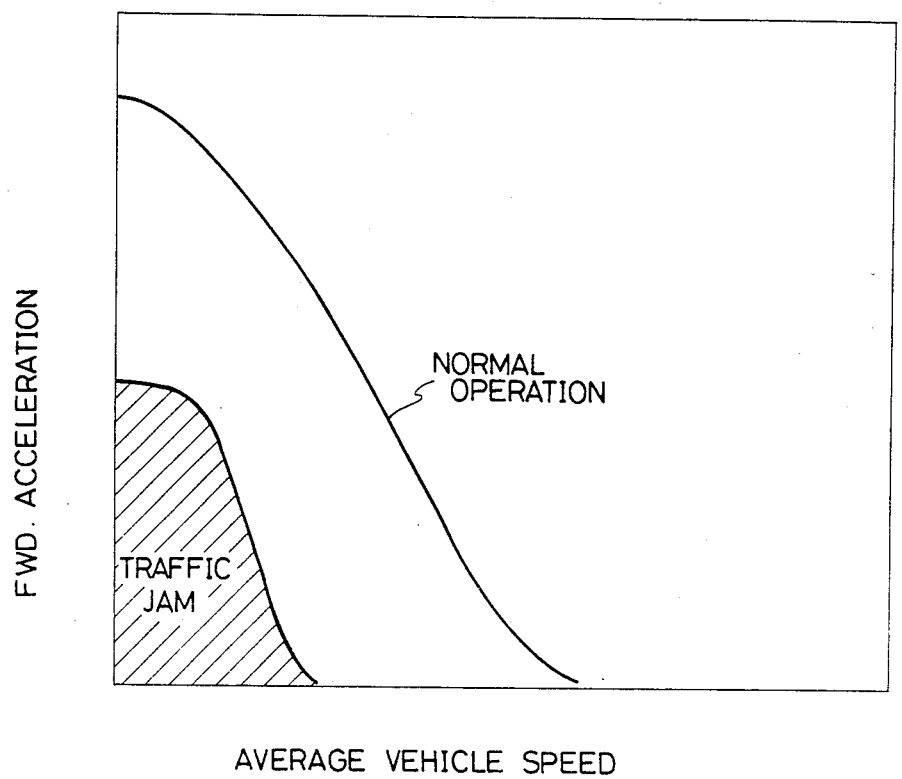
FIG. 14 is a diagram showing a further example of detecting a traffic jam.

Referring to FIG. 14, there is shown a relationship between the forward vehicle acceleration and the average vehicle speed in a predetermined time interval. The forward vehicle acceleration is obtained by a median value of the accelerations in the predetermined time interval. Under a normal operation, the relationship is as shown by a solid line in FIG. 14, however, under a traffic jam, the relationship falls in a shadowed zone. Therefore, it is possible to draw a jam detection map based on the shadowed zone.

Detection by Vehicle Speed Distribution

Figure 15:
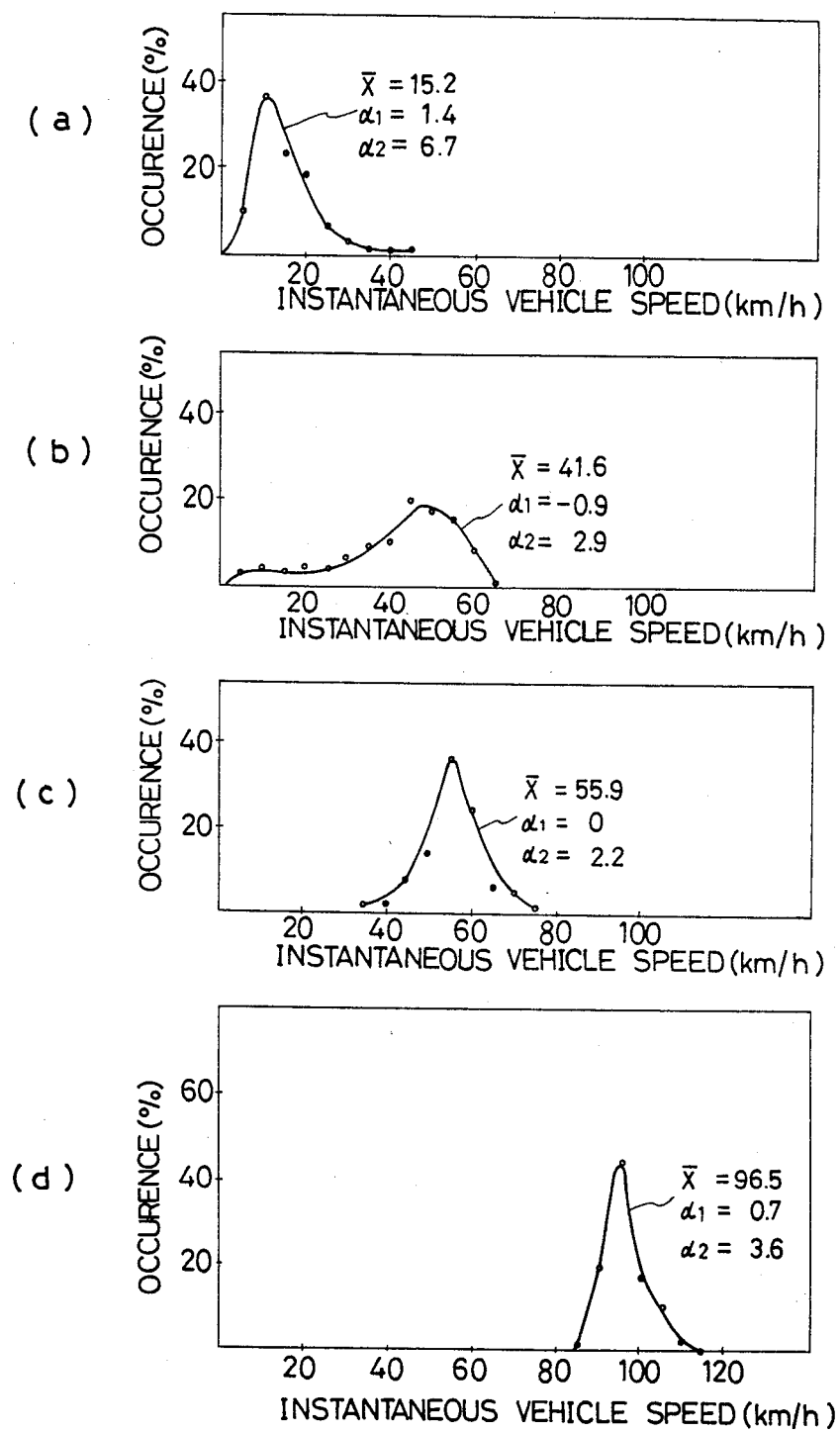
FIG. 15 is a diagram showing a further example of detecting a traffic jam.
Figure 16:
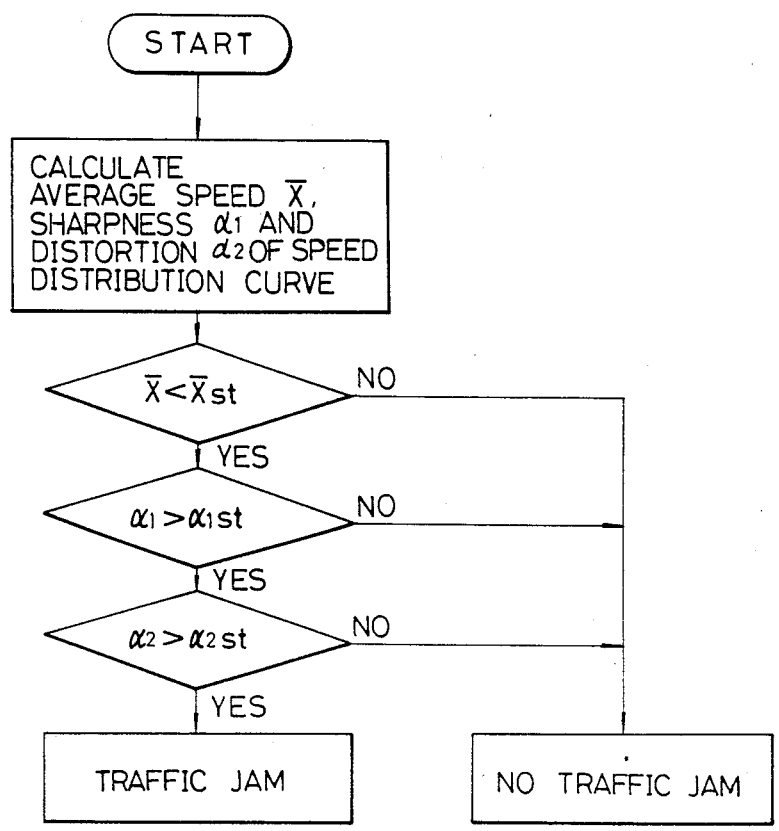
FIG. 16 is a program flow chart showing the control based on the diagram shown in FIG. 16.

Referring to FIG. 15, there are shown several examples of instantaneous vehicle speed occurrences. In traffic jam, the instantaneous vehicle speed is mostly concentrated at a low speed range as shown in FIG. 15(a) as compared with a normal city area operation shown in FIG. 15(b), an out-of-city operation shown in FIG. 15(c) and a highway operation shown in FIG. 15(d). In each case, the average value $\overline{X}$ of the instantaneous speeds, and the sharpness $\alpha_1$ and the distortion $\alpha_2$ of the speed distribution curve are shown in FIG. 15. For each of the values $\overline{X}$, $\alpha_1$ and $\alpha_2$, it is possible to determine a reference for judging a traffic jam. Such references may be designated as $\overline{X}st$, $\alpha_1 st$ and $\alpha_2 st$, respectively. As shown in FIG. 16, operations are carried out to obtain actual values $\overline{X}$, $\alpha_1$ and $\alpha_2$ and these values are compared with the reference values $\overline{X}st$, $\alpha_1 st$ and $\alpha_2 st$, respectively. When the actual value $\overline{X}$ is smaller than the reference value $\overline{X}st$ and the actual values $\alpha_1$ and $\alpha_2$ are larger than the reference values $\alpha_1 st$ and $\alpha_2 st$, respectively, it is judged that there is a traffic jam.

The invention has thus been shown and described with reference to specific examples, however, it should be noted that the invention is in no way limited to the details of the illustrated arrangements but changes and modifications may be made without departing from the scope of the appended claims.

We claim:

1. An automatic transmission for vehicles, said automatic transmission comprising:
a torque converter having an input member and an output member,
a multiple stage transmission gear mechanism connected with the output member of the torque converter and having a plurality of gear stages,
gear selecting means for selecting one of the gear stages in the transmission gear mechanism,
vehicle operating condition detecting means for detecting vehicle operating conditions and producing vehicle operating condition signals,
gear shift control means for operating said gear selecting means in accordance with the vehicle operating condition signals to thereby make the gear selecting means select one of the gear stages,
said gear shift control means including first gear shift means having memories of first vehicle operating conditions wherein said gear selecting means is to be operated, second gear shift means having memories of second vehicle operating conditions wherein said gear selecting means is to be operated, traffic jam detecting means for detecting a traffic jam, and means for operating said gear selecting means under said first gear shift means when the traffic jam is not detected but under said second gear shift means when the traffic jam is detected so that a corresponding gear shift operation is carried out at a lower vehicle speed in a traffic jam than in an operating condition wherein the traffic jam is not detected,
said traffic jam detecting means including memory means having memories of a traffic jam zone defined by a relationship between average vehicle speeds and acceleration rates corresponding to the average vehicle speeds, means for detecting an operating condition in terms of an actual average speed in a predetermined time interval and an actual acceleration rate corresponding to the actual average speed, and means for judging that there is a traffic jam when the operating condition is in the traffic jam zone.

2. An automatic transmission for vehicles, said automatic transmission comprising:
a torque converter having an input member and an output member,
a multiple stage transmission gear mechanism connected with the output member of the torque converter and having a plurality of gear stages,
gear selecting means for selecting one of the gear stages in the transmission gear mechanism,
vehicle operating condition detecting means for detecting vehicle operating conditions and producing vehicle operating condition signals,
gear shift control means for operating said gear selecting means in accordance with the vehicle operating condition signals to thereby make the gear selecting means select one of the gear stages,
said gear shift control means including first gear shift means having memories of first vehicle operating conditions wherein said gear selecting means is to be operated, second gear shift means having memories of second vehicle operating conditions wherein said gear selecting means is to be operated, traffic jam detecting means for detecting a traffic jam, and means for operating said gear selecting means under said first gear shift means when the traffic jam is not detected but under said second gear shift means when the traffic jam is detected so that a corresponding gear shift operation is carried out at a lower vehicle speed in a traffic jam than in an operating condition wherein the traffic jam is not detected,
said traffic jam detecting means including memory means having memories of a traffic jam zone defined by a relationship between average vehicle speeds and vehicle stop frequency corresponding to the average vehicle speeds, means for detecting an operating condition in terms of an actual average speed in a predetermined time interval and an actual vehicle stop frequency corresponding to the actual average speed, and means for judging that there is a traffic jam when the operating condition is in the traffic jam zone.

3. An automatic transmission for vehicles, said automatic transmission comprising:
a torque converter having an input member and an output member,
a multiple stage transmission gear mechanism connected with the output member of the torque converter and having a plurality of gear stages,
gear selecting means for selecting one of the gear stages in the transmission gear mechanism,
vehicle operating condition detecting means for detecting vehicle operating conditions and producing vehicle operating condition signals,
gear shift control means for operating said gear selecting means in accordance with the vehicle operating condition signals to thereby make the gear selecting means select one of the gear stages,
said gear shift control means including first gear shift means having memories of first vehicle operating conditions wherein said gear selecting means is to be operated, second gear shift means having memories of second vehicle operating conditions wherein said gear selecting means is to be operated, traffic jam detecting means for detecting a traffic jam, and means for operating said gear selecting means under said first gear shift means when the traffic jam is not detected but under said second gear shift means when the traffic jam is detected so that a corresponding gear shift operation is carried out at a lower vehicle speed in a traffic jam than in an operating condition wherein the traffic jam is not detected, said traffic jam detecting means including memory means having memories of a traffic jam zone defined by a relationship between average vehicle speeds and a vehicle forward acceleration corresponding to the average vehicle speeds, means for detecting an operating condition in terms of an actual average speed in a predetermined time interval and an actual vehicle forward acceleration obtained as a median value of accelerations measured in said predetermined time, and means for judging that there is a traffic jam when the operating condition is in the traffic jam zone.

4. An automatic transmission for vehicle, said automatic transmission comprising:

a torque converter having an input member and an output member, a multiple stage transmission gear mechanism connected with the output member of the torque converter and having a plurality of gear stages, gear selecting means for selecting one of the gear stages in the transmission gear mechanism, vehicle operating condition detecting means for detecting vehicle operating conditions and producing vehicle operating condition signals, gear shift control means for operating said gear selecting means in accordance with the vehicle operating condition signals to thereby make the gear selecting means select one of the gear stages, said gear shift control means including first gear shift means having memories of first vehicle operating conditions wherein said gear selecting means is to be operated, second gear shift means having memories of second vehicle operating conditions wherein said gear selecting means is to be operated, traffic jam detecting means for detecting a traffic jam, and means for operating said gear selecting means under said first gear shift means when the traffic jam is not detected but under said second gear shift means when the traffic jam is detected so that a corresponding gear shift operation is carried out at a lower vehicle speed in a traffic jam than in an operating condition wherein the traffic jam is not detected, said vehicle operating condition detecting means including vehicle speed detecting means and engine load detecting means, said first and second vehicle operating conditions being determined as functions of the vehicle speed and the engine load, said traffic jam detecting means being means for sampling vehicle speed signals from said vehicle speed detecting means for a predetermined time interval, operation means for calculating distributions of vehicle speeds, and means for judging a traffic jam based on the distributions of the vehicle speeds.

5. An automatic transmission in accordance with claim 2 in which said vehicle operating condition detecting means includes vehicle speed detecting means and engine load detecting means, said first and second vehicle operating conditions being determined as functions of the vehicle speed and the engine load.

6. An automatic transmission in accordance with claim 2 in which said operating means includes means for operating said gear selecting means under said second gear shift means when vehicle speed and engine load as detected by said vehicle speed detecting means and said engine load detecting means, respectively, are lower than predetermined values.

7. An automatic transmission in accordance with claim 3 in which said vehicle operating condition detecting means includes vehicle speed detecting means and engine load detecting means, said first and second vehicle operating conditions being determined as functions of the vehicle speed and the engine load.

8. An automatic transmission in accordance with claim 3 in which said operating means includes means for operating said gear selecting means under said second gear shift means when vehicle speed and engine load as detected by said vehicle speed detecting means and said engine load detecting means, respectively, are lower than predetermined values.

9. An automatic transmission in accordance with claim 4 in which said operating means includes means for operating said gear selecting means under said second gear shift means when vehicle speed and engine load as detected by said vehicle speed detecting means and said engine load detecting means, respectively, are lower than predetermined values.

10. An automatic transmission in accordance with claim 1 in which said vehicle operating condition detecting means includes vehicle speed detecting means and engine load detecting means, said first and second vehicle operating conditions being determined as functions of the vehicle speed and the engine load.

11. An automatic transmission in accordance with claim 10 in which said operating means includes means for operating said gear selecting means under said second gear shift means when vehicle speed and engine load as detected by said vehicle speed detecting means and said engine load detecting means, respectively, are lower than predetermined values.

12. An automatic transmission in accordance with claim 4 in which said operation means includes means for calculating an average vehicle speed, a sharpness of speed distribution curve and a distortion of the speed distribution curve, means for comparing calculated values with corresponding predetermined values and judging that there is a traffic jam when the average vehicle speed is lower than the predetermined value and the sharpness and distortion are larger than the predetermined values.

13. An automatic transmission for vehicles comprising a torque converter having an input member and an output member, a multiple stage transmission gear mechanism connected with the output member of the torque converter and having a plurality of gear stages, gear selecting means for selecting one of the gear stages in the transmission gear mechanism, vehicle operating condition detecting means for detecting vehicle operating conditions and producing vehicle operating condition signals, gear shift control means for operating said gear selecting means in accordance with the vehicle operating condition signals to thereby make the gear selecting means select one of the gear stages, said gear shift control means including first gear shift means having memories of first vehicle operating conditions wherein said gear selecting means is to be operated so that an appropriate gear stage is selected for obtaining a sufficient driving torque for normal vehicle operations, second gear shift means having memories of second vehicle operating conditions wherein said gear selecting means is to be operated so that an higher gear stage is selected for obtaining a better fuel economy than in an operation under the first gear shift means, traffic jam detecting means for detecting a traffic jam, and means for operating said gear selecting means under said first gear shift means when the traffic jam is not detected but under said second gear shift means when the traffic jam is detected.

* * * * *